United States Patent
Bachmann

(10) Patent No.: US 6,449,954 B2
(45) Date of Patent: Sep. 17, 2002

(54) PROCESS AND APPARATUS FOR THE RECOVERY OF WATER FROM THE FLUE GAS OF A COMBINED CYCLE POWER STATION

(75) Inventor: Rolf Bachmann, Dottingen (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/758,186

(22) Filed: Jan. 12, 2001

(30) Foreign Application Priority Data

Jan. 13, 2000 (DE) .......................................... 100 01 110

(51) Int. Cl.$^7$ ................................................. F02C 6/18
(52) U.S. Cl. ...................... 60/775; 60/39.182; 60/39.5
(58) Field of Search .............................. 60/775, 39.182, 60/39.5, 39.52, 39.53, 39.55

(56) References Cited

U.S. PATENT DOCUMENTS 4,434,613 A * 3/1984 Stahl ........................ 60/39.182
5,761,896 A * 6/1998 Dowdy et al. ............. 60/39.55
5,771,678 A * 6/1998 Shouman .................... 60/39.55

* cited by examiner

Primary Examiner—Louis J. Casaregola
(74) Attorney, Agent, or Firm—Burns, Doane, Swecker & Mathis, L.L.P.

(57) ABSTRACT

In a process for the recovery of water, which arises from the combustion of a fuel (19), particularly natural gas, in a combined cycle power station (101) including a gas turbine plant (11), a waste heat boiler (33), and a steam turbine (25) arranged in a water/steam circuit with the waste heat boiler (33), and/or which is added in the form of water or steam (36), the water is condensed out from the flue gas (42) arising from the combustion of the fuel (19) and containing water in the form of water vapor after flowing through the waste heat boiler (33), and is separated in liquid form, in particular by expansion in a utilization turbine (20).

19 Claims, 5 Drawing Sheets

PROCESS AND APPARATUS FOR THE RECOVERY OF WATER FROM THE FLUE GAS OF A COMBINED CYCLE POWER STATION

BACKGROUND

1. Field of the Invention

The present invention relates to the field of combined cycle power stations (combined plant). It relates to a process for the recovery of water which arises in a combined plant, and also to a combined cycle power station.

2. Related Art

Combined cycle power stations normally burn natural gas, which produces water vapor during combustion. 1 kg of natural gas burns to about 2 kg of water and also $CO_2$. The flue gas with the water contained therein is usually discharged through a chimney at elevated temperatures, without the water being used to advantage. The same also holds for water or steam, which in other cases is injected or sprayed in during combustion and thus becomes a component of the flue gas. On the other hand, water already forms an increasingly valuable resource at the present time.

The simplified diagram of an exemplary combined cycle power station from the state of the art is reproduced in FIG. 1. The combined cycle power station 10 essentially comprises a gas turbine plant 11, a waste heat boiler (heat recovery steam generator HRSG) 33, and a steam turbine 25, which are connected together. The gas turbine plant 11 consists of a compressor 14 and a turbine 17, which are arranged on a rotor 16, and also a combustion chamber 15. In operation, the compressor 14 sucks in air through an air inlet 12, compresses it, and delivers the compressed air to the combustion chamber 15, where it enters combustion as combustion air, together with a liquid or gaseous fuel 19 (e.g., natural gas) which is fed in through a fuel supply duct 21. In addition, water or steam 36 can be injected or sprayed into the combustion chamber 15 to reduce the combustion temperature. The hot combustion gases are conducted from the combustion chamber 15 into the turbine 17, where they set the rotor 16 in rotation. The flue gas 42 exiting the turbine 17 is then conducted through the waste heat boiler 33 for the production of steam, where it flows in succession through a superheater 40, an evaporator 39, and a preheater (economizer) 34, and gives up heat stepwise. The cooled flue gas 42 finally leaves the waste heat boiler 33 and is usually, possibly after a flue gas cleaning, discharged from a chimney.

The superheater 40, evaporator 39 and preheater 34 are connected in series as part of a water/steam circuit, in which the steam turbine is also connected. The exhaust steam from the steam turbine 25 passes into a condenser 26 and condenses there. The condensate is pumped by a condensate pump 28, possibly with the addition of additional water 27, through a feed water duct 29 to a feed water container 30 with degasser. The degassed condensate is then pumped as feed water 32 through the preheater 34 by a boiler feed pump 31, and as pressurized feed water 35 to a steam drum 37 with the connected evaporator 39. The steam then passes to the superheater 40, where it is superheated, and finally drives the steam turbine 25 as superheated steam 41. Both the steam turbine 25 and also the gas turbine plant 11 respectively drive a generator 13 or 24 which produces electrical current. Means for the recovery of water or water vapor contained in the flue gas are not provided here.

SUMMARY OF THE INVENTION

The invention therefore has as an object to provide a process and also a combined cycle power station with which the water contained in the flue gas is recovered and can be advantageously reused.

An aspect of the invention involves configuring the combined cycle power station and conducting the process so that the water is condensed out of the flue gas after leaving the waste heat boiler and is separated in liquid form.

A first preferred embodiment of the process according to the invention is characterized in that the flue gas is expanded for condensing the water out, with output of work. The expansion is preferably carried out by means of a utilization turbine. In particular, the waste heat boiler is operated for this purpose at a pressure exceeding the ambient air pressure by several bar, preferably 2–5 bar, and the flue gas is brought to the ambient air pressure by the subsequent expansion. Alternatively to this, the waste heat boiler can be operated at about the ambient pressure with respect to the flue gas, the flue gas subsequently being expanded into a vacuum, and the flue gas being compressed again to ambient air pressure after the separation of water. In both cases, the water is separated from the flue gas particularly during the expansion or in the utilization turbine itself, and/or in a droplet separator following the expansion or the utilization turbine.

A second preferred embodiment of the process according to the invention is characterized in that the waste heat boiler is operated with respect to the flue gas at a pressure exceeding the ambient air pressure by several bar, preferably 2–5 bar, in that the water is condensed out of the flue gas on cold surfaces after leaving the waste heat boiler, in particular on the cold tubes of a heat exchanger, and in that the dewatered flue gas is brought to the ambient air pressure by a subsequent expansion; here also, the expansion is preferably carried out by means of a utilization turbine.

A preferred embodiment of the combined cycle power station according to the invention is distinguished in that the means for condensation and separation comprise means for the expansion of the flue gas, preferably in the form of a utilization turbine.

A first development of this embodiment is characterized in that the expansion means or the utilization turbine is followed by a droplet separator.

A second development of this embodiment is characterized in that the expansion means comprises a utilization turbine working in vacuum, and that a compressor follows the utilization turbine.

A third development of this embodiment is characterized in that condensation means, particularly in the form of a heat exchanger, is arranged between the waste heat boiler and the expansion means.

BRIEF DESCRIPTION OF THE DRAWINGS

The invention will be explained in detail hereinafter using embodiment examples in combination with the accompanying drawings.

DETAILED DESCRIPTION OF PREFERRED EMBODIMENTS

The basic idea of the invention can be characterized as "supercharged waste heat boiler of a combined cycle power station with water separation by way of temperature drop or partial pressure". The idea can be explained using the T-S diagram shown in FIG. 2 of an example of the performance of the process. From the point P1 on the isobar of the ambient air pressure $p_A$, the air sucked in by the compressor (14 in FIG. 1) is compressed along the curve "a" to the combustion chamber pressure (isobar $P_{BK}$) and is heated in the combustion chamber at constant pressure (curve "b"). The gas turbine (17 in FIG. 1) in a combined plant now expands the flue gas along the curve "c" to a pressure $p_K$ in the waste heat boiler (33 in FIG. 1), which is at several bar, e.g., 2–5 bar, above the ambient air pressure $p_A$. The "supercharged" waste heat boiler removes heat from the flue gas for the production of steam, and thus cools the flue gas to about 80–90° C. (curve "d").

If now this flue gas is expanded (along the curve "e") by means of a utilization turbine or comparable means, low temperatures arise at the point P2 after the turbine, corresponding to the pressure before the turbine. The water content of the flue gas condenses, particles which may be present in the flue gas serve as condensation nulei. The water can then be separated in the turbine itself or in a subsequent droplet separator, and subsequently drawn off.

Figure 1:
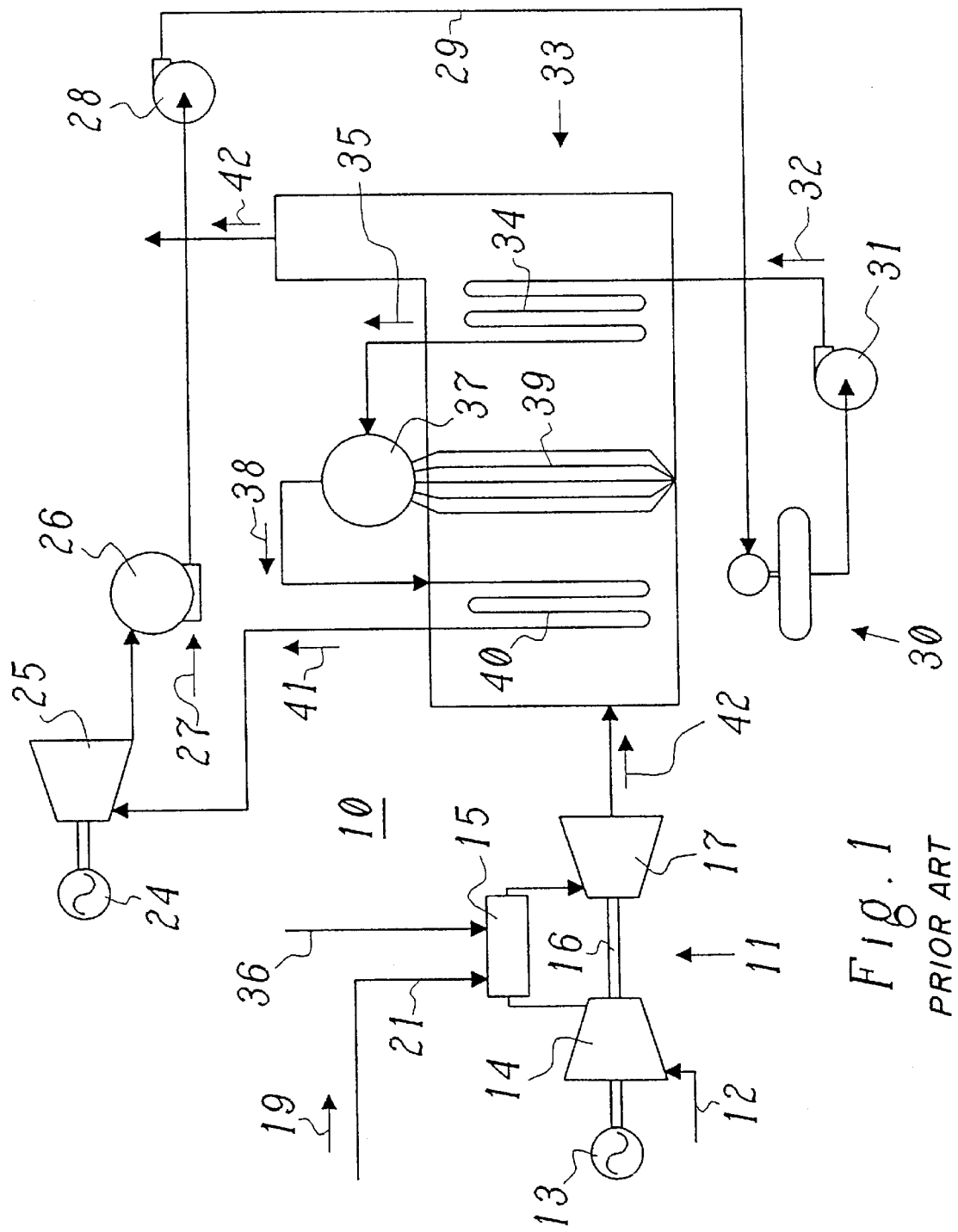
FIG. 1 is a simplified diagram of an exemplary combined cycle power station from the state of the art, to which the invention can be applied.
Figure 2:
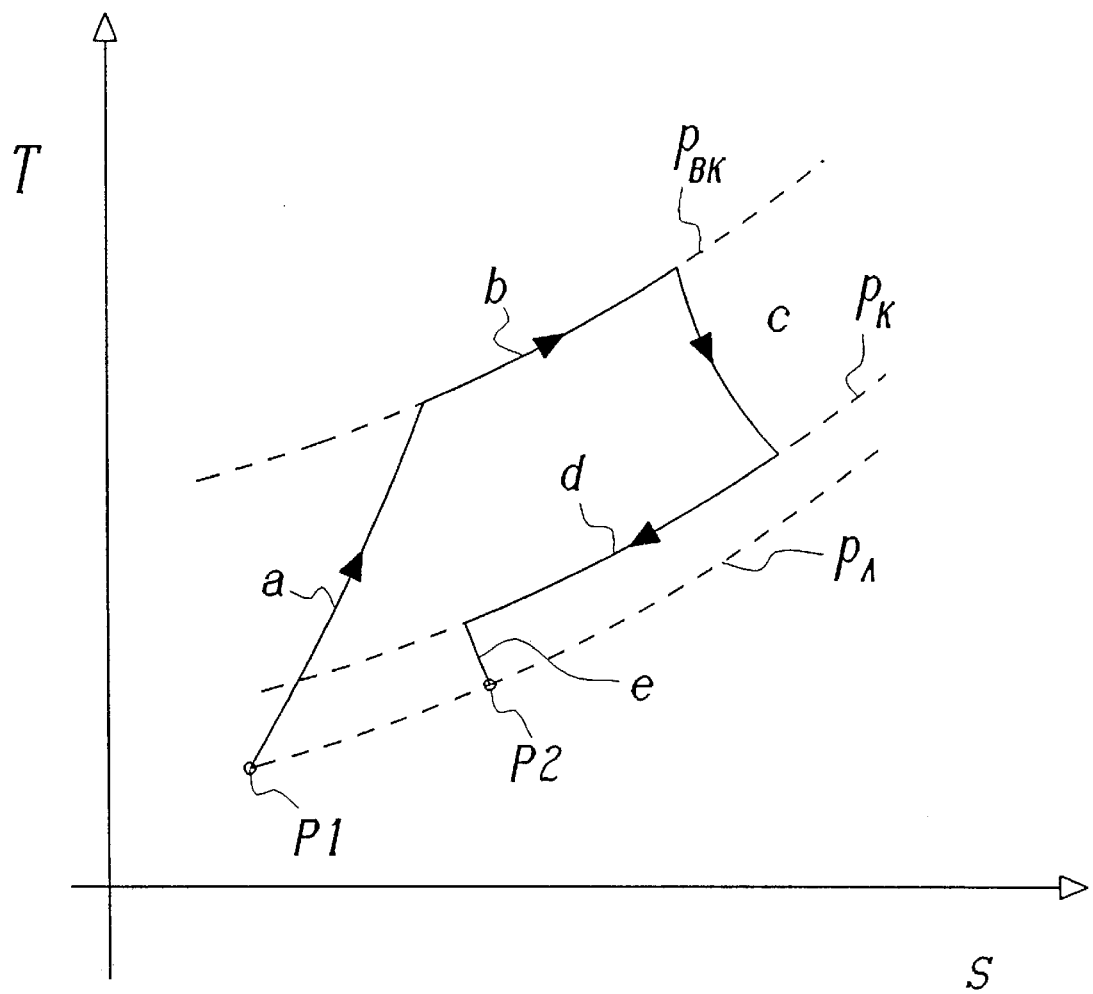
FIG. 2 is a T-S [temperature-entropy] diagram illustrating the conduct of the process in a preferred embodiment example of the process according to the invention.
Figure 3:
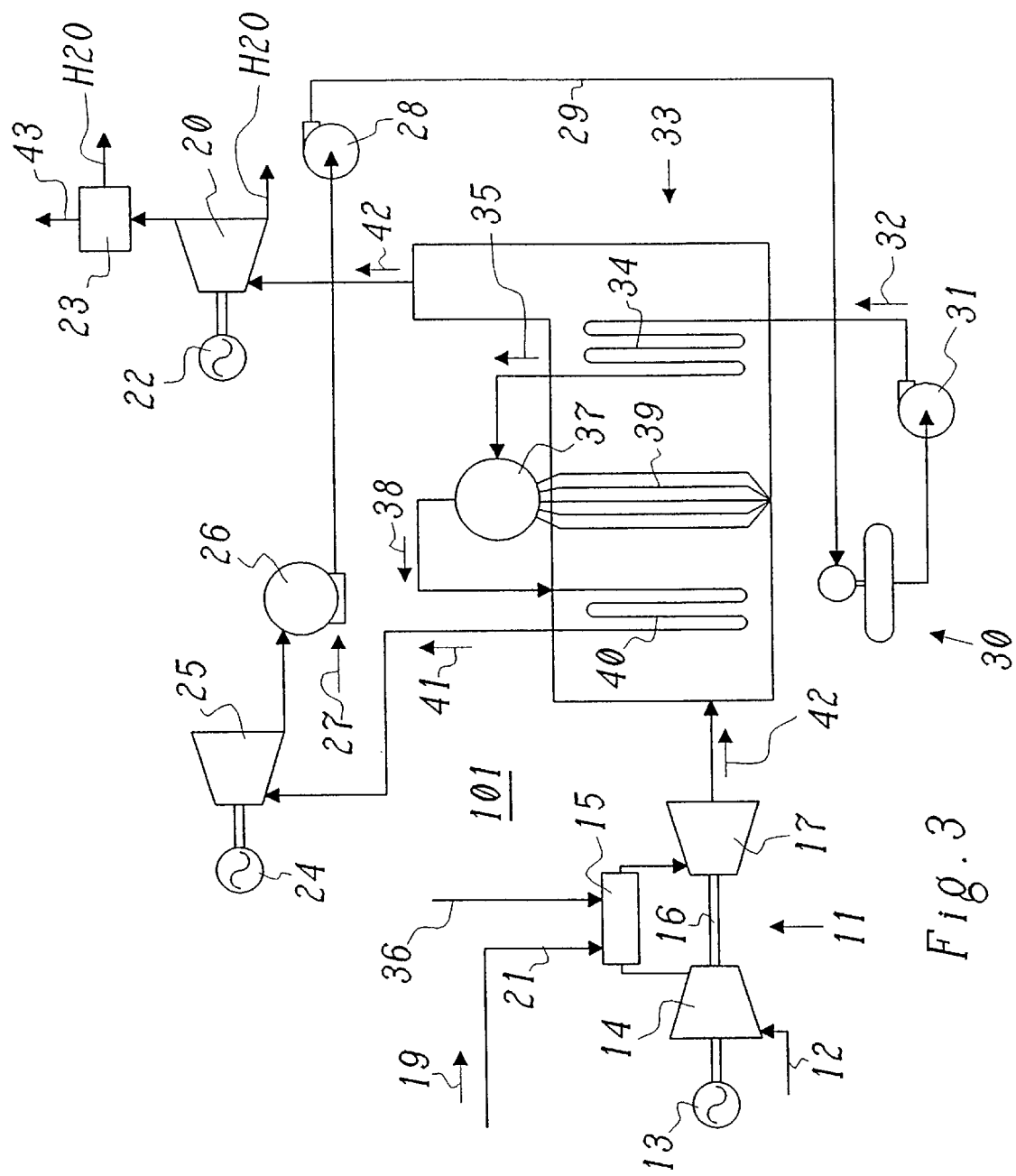
FIG. 3 is a diagram of a combined cycle power station comparable to FIG. 1, according to a first embodiment example of the invention, with an expansion of the flue gas to ambient air pressure.

A combined cycle power station 101 designed for the performance of this process is reproduced in FIG. 3, which is comparable to the illustration of FIG. 1 (the same parts are given the same reference numerals). The combined cycle power station 101 of FIG. 3 differs from the combined cycle power station 10 of FIG. 1 in the flue gas sequence following the waste heat boiler 33. In the combined cycle power station 101, a utilization turbine 20 (which for example drives a generator 22) for the exiting flue gas 42 containing water vapor, and also a droplet separator 23, follow the waste heat boiler 33. The flue gas 42 under pressure is cooled in the utilization turbine 20 by expansion. The water vapor then condenses and can be removed either already at the utilization turbine 20 or in the following droplet separator 23. The "dewatered" flue gas 43 then leaves the droplet separator 23. This kind of water recovery has the following advantages:

- The plant is very compact; the gas turbine can, e.g., be embodied as a variant of a standard machine without end stage;
- good heat transfer coefficients are obtained in the waste heat boiler;
- a chimney can be omitted, since the "dewatered" flue gas leaves the plant at low temperatures;
- the "cold" of the flue gases can be further utilized, e.g., for cooling purposes or at the intake side of the gas turbine (booster).

Figure 4:
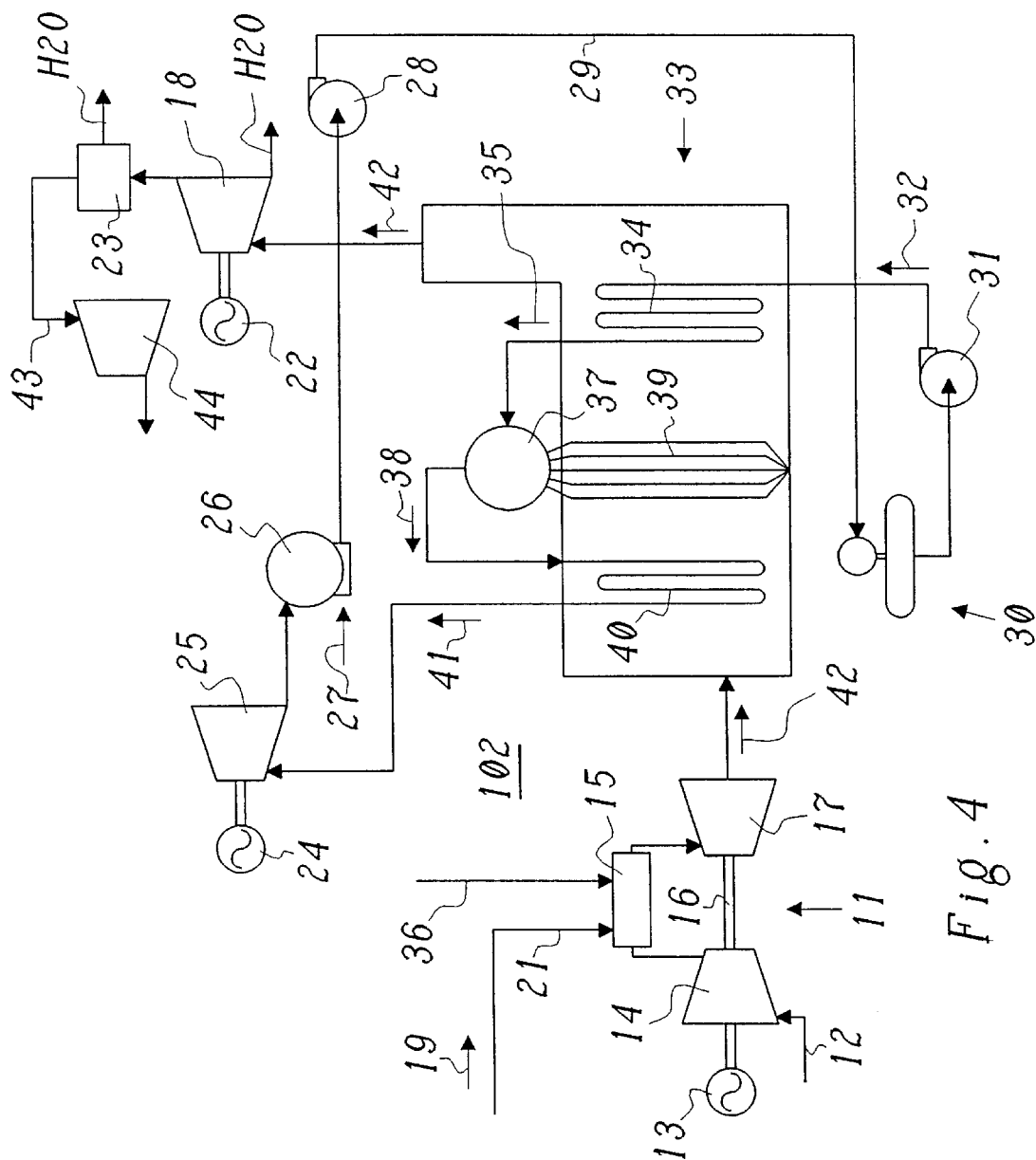
FIG. 4 is a diagram of a combined cycle power station comparable to FIG. 1, according to a second embodiment example of the invention, with an expansion of the flue gas into vacuum and subsequent compression to ambient air pressure.

On the other hand, a slight performance loss results, since the expansion line of the gas turbine is made smaller, and this is only partially compensated by the recuperation in the steam turbine and in the utilization turbine after the waste heat boiler. In order to remedy it, the water recovery can also be carried out in a modified form:

In an alternative manner of conducting the process, for which the combined cycle power station 102 according to FIG. 4 is designed, the waste heat boiler 33 is not "supercharged", but operates at about atmospheric pressure. The following utilization turbine 18 (with generator 22) expands the flue gas 42 into a vacuum. After the separation of the water (H2O) in the utilization turbine 18 or in a following droplet separator 23, the "dewatered" flue gas 43 is again compressed to ambient air pressure in a compressor 44 (with a reduced flue gas mass flow).

Figure 5:
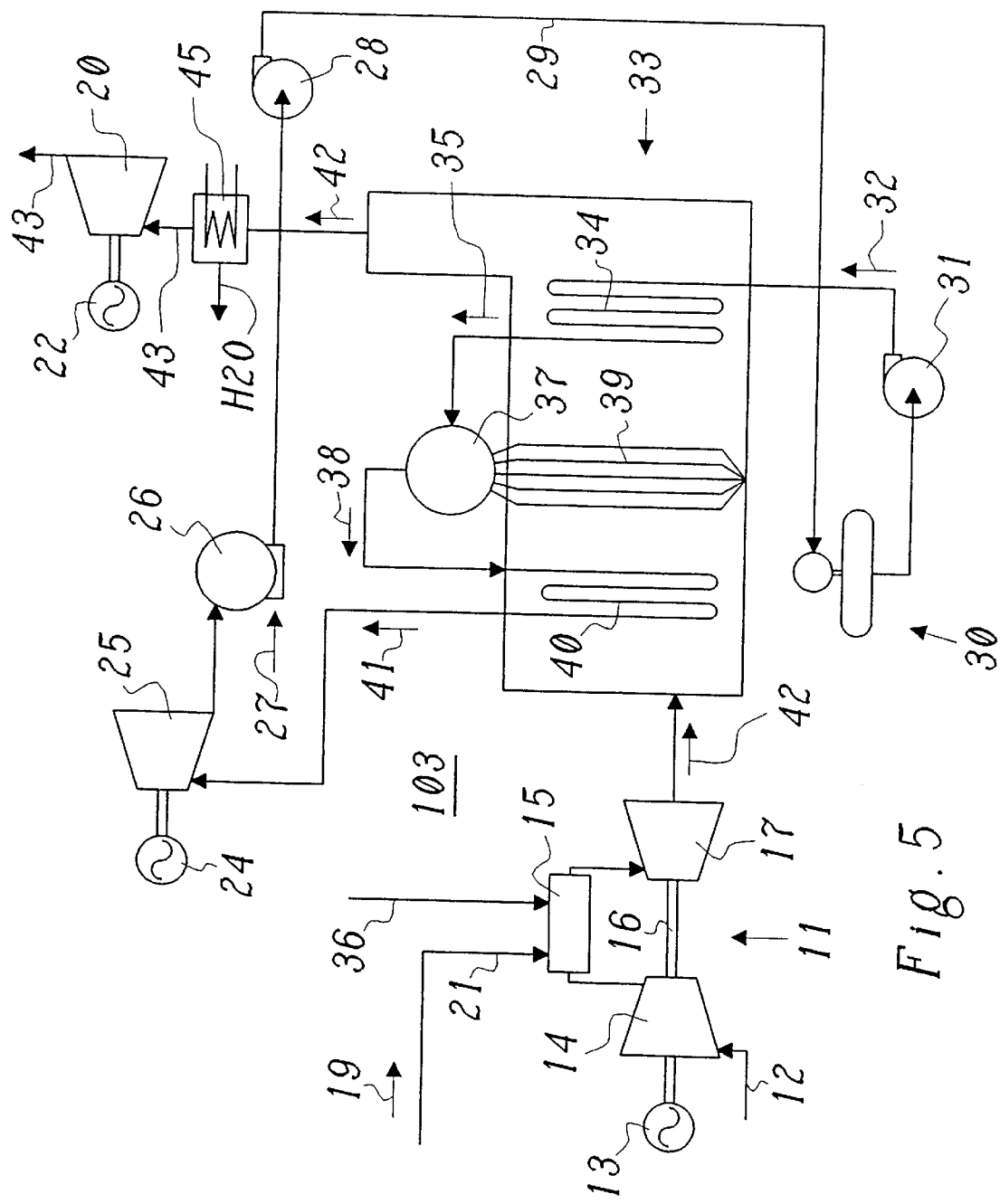
FIG. 5 is a diagram of a combined cycle power station comparable to FIG. 1, according to a third embodiment example of the invention, with an expansion of the flue gas to ambient air pressure after a preceding condensation of the water vapor.

In another alternative manner of conducting the process, for which the combined cycle power station 103 according to FIG. 5 is designed, the waste heat boiler 33—as in the combined cycle power station 101 of FIG. 3—is run "supercharged". After leaving the waste heat boiler, the water vapor of the flue gas 42 is condensed on cold surfaces or tubes of a heat exchanger 45, making use of the high partial pressure. An expansion of the "dewatered" flue gas 43 takes place thereafter in a utilization turbine 20.

What is claimed is:

1. A process for the recovery of water from a combined cycle power station having a gas turbine plant, a waste heat boiler, and a steam turbine, the gas turbine plant and the waste heat boiler arranged in a flue gas path, the steam turbine and the waste heat boiler arranged in a water/steam circuit, the method comprising the steps of:

combusting fuel to generate flue gas, the flue gas including water in vapor form;

condensing out water from the flue gas;

separating water in liquid form the flue gas after passage through the waste heat boiler, wherein the step of condensing out water from the flue gas comprises expanding the flue gas to condense water out.

2. A process according to claim 1, wherein the expanding step is performed by a utilization turbine.

3. A process according to claim 1, comprising:

operating the waste heat boiler at a flue gas pressure exceeding the ambient pressure; and subsequently expanding the flue gas to ambient air pressure by the expanding step.

4. A process according to claim 1, comprising:

operating the waste heat boiler at a flue gas pressure at about ambient air pressure;

expanding the flue gas in a vacuum; and compressing the flue gas to ambient air pressure after the step of separating water.

5. A process according to claim 1, wherein the step of separating water from the flue gas is performed during the expanding step or in a utilization turbine.

6. A process according to claim 2, wherein the step of separating water from the flue gas comprises separating in a droplet separator which follows the utilization turbine in the flue gas path.

7. A process according to claim 1, comprising:

operating the waste heat boiler at a flue gas pressure exceeding the ambient pressure;

condensing water out of the flue gas on cold surfaces after leaving the waste heat boiler, to generate dewatered flue gas; and expanding the dewatered flue gas to ambient air pressure.

8. A process according to claim 7, wherein the expanding step is performed by a utilization turbine.

9. A combined cycle power station useful for removing water from flue gases, the combined cycle power station comprising:

a gas turbine plant with a combustion chamber for the combustion of fuel, the gas turbine plant for producing hot flue gases;

a waste heat boiler connected to the gas turbine plant along a flue gas path for the production of steam by the hot flue gases;

a steam turbine arranged together with the waste heat boiler in a water/steam circuit; and condensation and separation means for the condensation of water vapor contained in the flue gas and for separation of the condensed water, the condensation and separation means following the waste heat boiler in the flue gas path and comprising means for the expansion of the flue gas.

10. A combined cycle power station according to claim 9, further comprising a droplet separator following the expansion means in the flue gas path.

11. A combined cycle power station according to claim 9, wherein the expansion means comprises a utilization turbine expanding into vacuum, and further comprising a compressor following the utilization turbine in the flue gas path.

12. A combined cycle power station according to claim 9, wherein condensation and separation means is arranged between the waste heat boiler and the expansion means in the flue gas path.

13. A method according to claim 1, wherein the combustion of fuel comprises the combustion of natural gas.

14. A method according to claim 3, wherein the step of operating the waste heat boiler comprises operating the waste heat boiler at a flue gas pressure exceeding the ambient air pressure by 2–5 bar.

15. A method according to claim 1, wherein the step of expanding the flue gas to condense out water comprises an output of work.

16. A method according to claim 7, wherein the step of operating the waste heat boiler comprises operating the waste heat boiler at a flue gas pressure exceeding the ambient air pressure by 2–5 bar.

17. A method according to claim 7, wherein the step of condensing water out of the flue gas on cold surfaces comprises condensing water on the cold tubes of a heat exchanger.

18. A combined cycle power station according to claim 9, wherein the means for the expansion of the flue gas comprises a utilization turbine.

19. A combined cycle power station according to claim 12, wherein the condensation and separation means comprises a heat exchanger.

* * * * *